US00RE36977E

United States Patent [19]

Rau

[11] E Patent Number: Re. 36,977

[45] Reissued Date of Patent: Dec. 5, 2000

[54] APPARATUS AND METHOD FOR ATTACHING A FLEXIBLE PRINTING PLATE

[75] Inventor: Gunnar Rau, Königsbrunn, Germany

[73] Assignee: MAN Roland Druckmaschinen AG, Offenbach am Main, Germany

[21] Appl. No.: 09/268,091

[22] Filed: Mar. 11, 1999

Related U.S. Patent Documents

Reissue of:

[64] Patent No.: 5,613,440
Issued: Mar. 25, 1997
Appl. No.: 08/429,813
Filed: Apr. 27, 1995

[30] Foreign Application Priority Data

May 4, 1994 [DE] Germany ..... 44 15 683.9

[51] Int. Cl.[7] ..... B41F 27/06; B41F 27/12

[52] U.S. Cl. ..... 101/415.1; 101/486

[58] Field of Search ..... 101/415.1, 401.1, 101/483, 485, 486, 378; 451/486, 499, 500

[56] References Cited

U.S. PATENT DOCUMENTS

| | | | |
|---|---|---|---|
| 3,756,691 | 9/1973 | Etchell et al. | 101/415.1 |
| 4,104,968 | 8/1978 | Schwaab et al. . | |
| 5,213,038 | 5/1993 | Takahashi et al. | 101/415.1 X |

FOREIGN PATENT DOCUMENTS

| | | |
|---|---|---|
| 0 252 746 A2 | 1/1988 | European Pat. Off. . |
| 0 534 579 A2 | 3/1993 | European Pat. Off. . |
| 223511 | 2/1973 | Germany . |
| 2235119 | 2/1973 | Germany . |
| 27 57 552 A1 | 6/1979 | Germany . |
| 38 09 667 | 12/1988 | Germany . |
| 41 38 925 | 6/1993 | Germany . |
| 41 38 925 A1 | 6/1993 | Germany . |
| 1-174132 | 12/1989 | Japan . |
| 4-45736 | of 1992 | Japan . |
| 5-77400 | 3/1993 | Japan . |

OTHER PUBLICATIONS

Search Report No. 95106414, Nov. 4, 1996, not translated.

*Primary Examiner*—Kimberly Asher
*Attorney, Agent, or Firm*—Cohen, Pontani, Lieberman & Pavane

[57] ABSTRACT

A mechanism for securely clamping a [priming] *printing* plate (6) to a form cylinder (1), in which a cylinder groove (2) formed in the form cylinder (1) has rotatably mounted therein a clamping spindle (7), which has a gripper edge (10) which clamps a V-shaped chamfer (11) of the leading flange (5) of the [priming] *printing* plate (6). The trailing flange (9) of the [priming] *printing* plate (6) is grasped and clamped in a positive-locking manner by leaf springs (8) mounted to the clamping spindle (7) which are hook-shaped.

31 Claims, 3 Drawing Sheets

APPARATUS AND METHOD FOR ATTACHING A FLEXIBLE PRINTING PLATE

Matter enclosed in heavy brackets [ ] appears in the original patent but forms no part of this reissue specification; matter printed in italics indicates the additions made by reissue.

FIELD OF THE INVENTION

The present invention relates to a device for attaching a flexible printing plate to the form cylinder of a printing machine.

BACKGROUND OF THE INVENTION

European Patent Document No. EP 534 579 A2 discloses a plate clamping device, in which the form cylinder has a cylinder groove running in the axial direction, one edge of which carries the leading flange of the plate. Furthermore, the cylinder groove contains a rotatable spindle, to which U-shaped leaf springs are mounted across the width of the form cylinder. One leg of the leaf springs is bent into a hook shape and engages with and grips, when the spindle is turned, the correspondingly hook-shaped tailing flange of the plate. The other leg of the springs presses the leading flange of the plate against the wall of the cylinder groove. In this device, however, the leading flange of the plate is not held securely in place on the wall of the cylinder groove.

SUMMARY OF THE INVENTION

The printing plate clamp of the present invention securely attaches a flexible printing plate to the form cylinder of the printing machine.

The device of the present invention not only secures the leading flange of the plate on to the wall of the cylinder groove, but also grasps and clamps the leading flange and draws it into the cylinder groove. Consequently, the leading edge of the plate is drawn onto the edge of the cylinder groove in the correct position. Before being wound around the form cylinder, the printing plate is positioned on the cylinder parallel to the edge of the groove.

In this way, register errors—including, in particular, diagonal register errors—are avoided when the printing plate is clamped into position.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
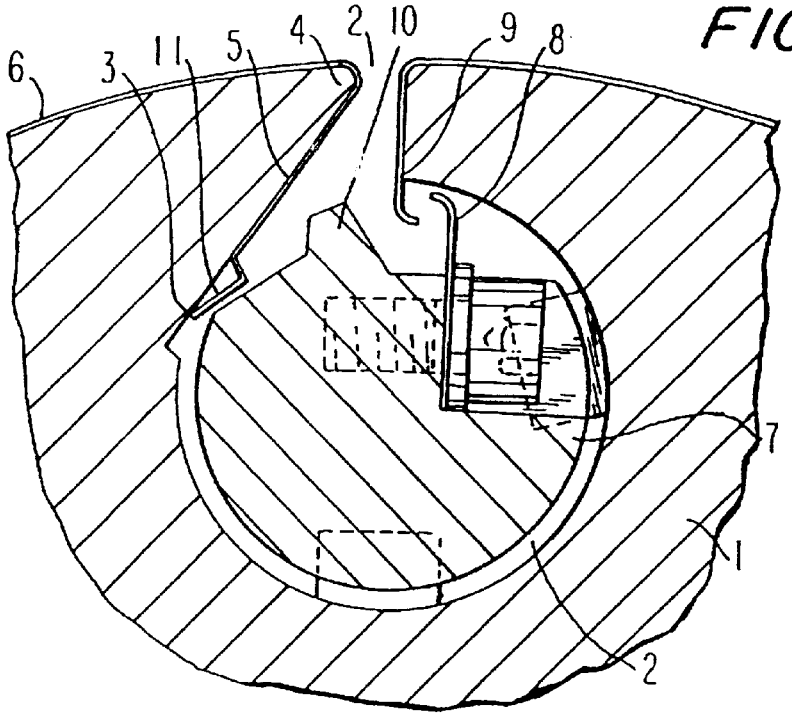
FIG. 1 is a cross-sectional drawing of a preferred embodiment of the printing plate clamping device of the present invention in the open position.
Figure 2:
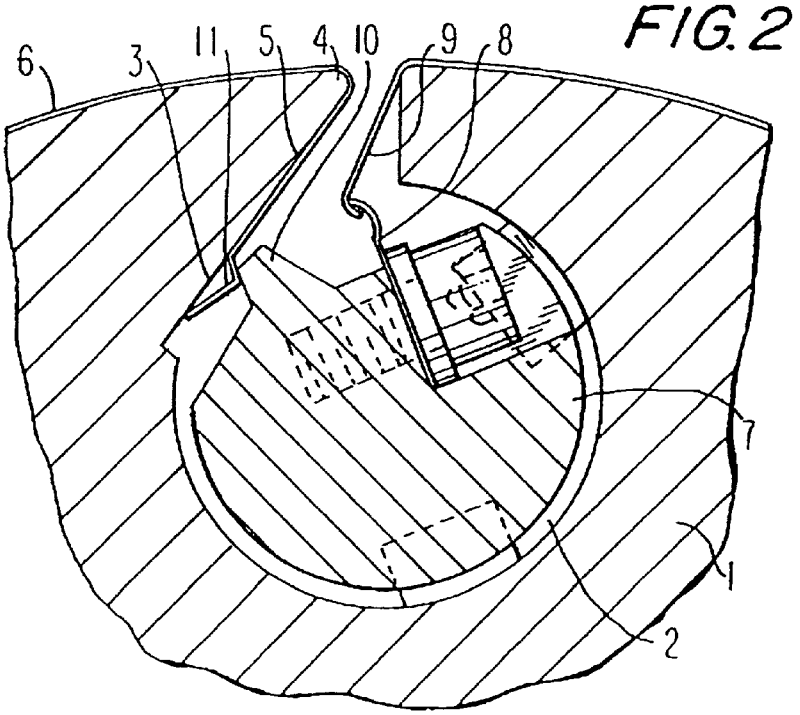
FIG. 2 is a cross-sectional drawing of the printing plate clamping device shown in FIG. 1 in the clamped or closed position.
Figure 3:
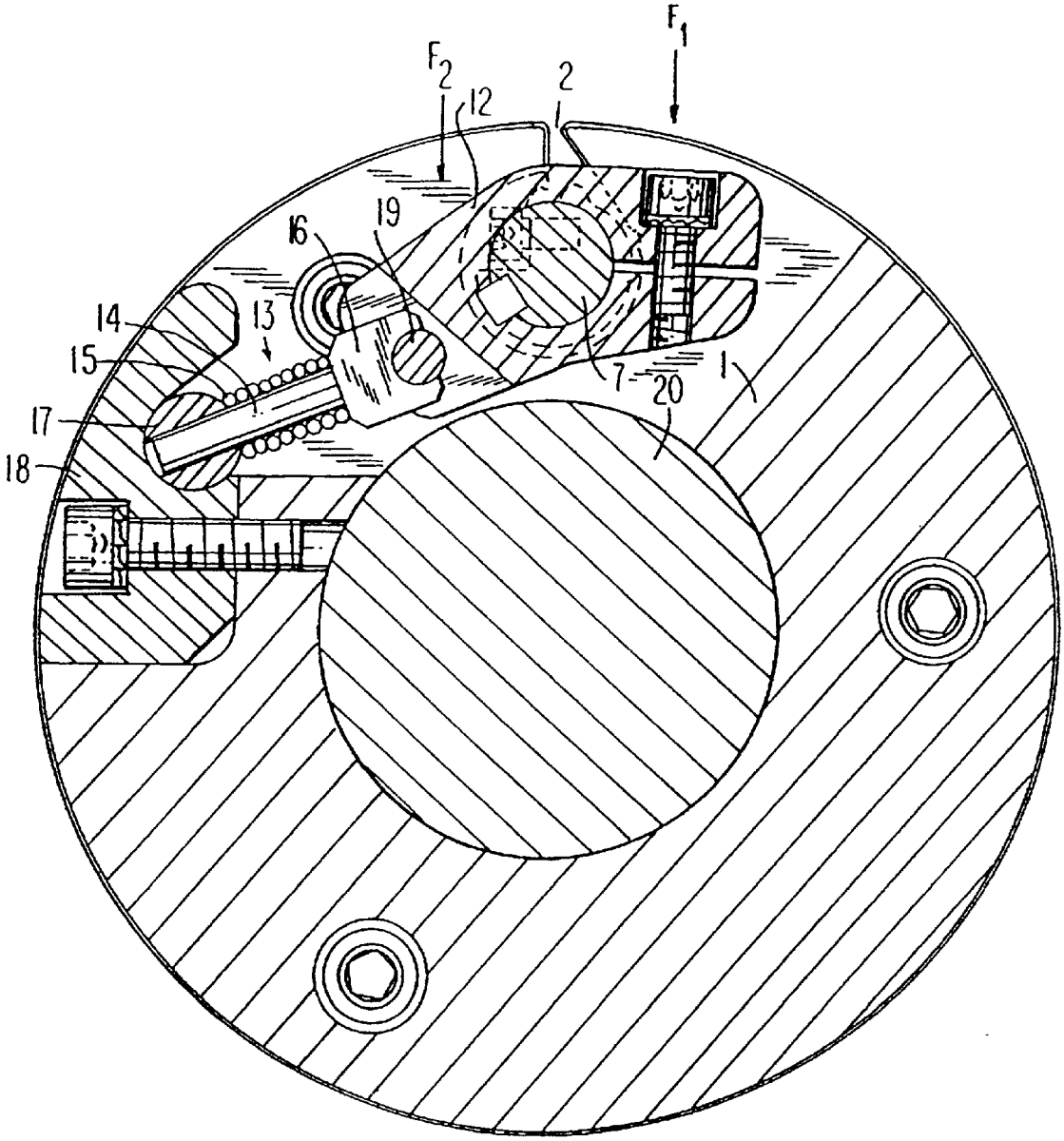
FIG. 3 is a side view of a preferred embodiment of an activating lever which is used to rotate the printing plate clamping device of the present invention.

The form cylinder 1 shown in cross-section in FIG. 1 has a cylinder groove 2 extending axially from its surface. A groove wall 3 extends at an acute angle relative to the outer surface of the cylinder 1 and forms an edge 4 at the surface of the cylinder 1 on which the leading flange 5 of the printing plate 6 is held. In the cylinder groove 2 there is a clamping spindle 7, which is rotatably mounted at its ends (one end of which is shown in FIG. 3) within the cylinder groove 2. Multiple leaf springs 8 are fixedly mounted to the clamp spindle 7, such as, for example, by bolts. The multiple leaf springs 8 are preferably substantially hook-shaped in cross-section with a curve of about 90° and are distributed or extend across at least a portion of the width of the printing plate 6 to be clamped, preferably along the entire width of the printing plate 6. The leaf springs 8 are shaped so as to engage with or grip the end of the trailing flange 9 of the printing plate 6 which is also hook-shaped with a curve of about 90° along at least a portion of its width, preferably along its entire width. Instead of using individual leaf springs 8, a single continuous leaf spring extending across the width of the printing plate can alternatively be used. The clamping spindle 7 has a protruding gripper edge 10, which, as shown in FIG. 2, clamps against and grips a V-shaped chamfer 11 on the leading flange 5 of the printing plate 6.

At least one of the two ends of the clamping spindle 7 is connected to a mechanism which rotates the clamping spindle 7 within the cylinder groove 2 of the form cylinder 1. A preferred embodiment of such a mechanism is shown in FIG. 3, in which one end of the clamping spindle 7 is connected to a lever 12, which is hingedly connected to a spring-deflectable pivoted lever 13. The pivoted lever 13 is comprised of a rod 14, onto which a fork head 16 can be deflected against the force of a pressure spring 15. The pivoted lever 13 is mounted within a bore of roller 17 which is rotatably mounted in an abutment 18, thereby permitting pivoted lever 13 to rotate. Furthermore, the pivoted lever 13 presses with its spring-loaded fork head 16 against a bolt 19 mounted to the lever 12.

To mount the printing plate 6 on to the form cylinder 1, the clamping spindle 7 first assumes the position shown in FIG. 1, and the corresponding positions of the levers 12 and 13, which activate the clamping spindle 7, are as shown in FIG. 3. The pivoted lever 13 thereby presses the lever 12 into a stop position. In the preferred embodiment shown in FIG. 3, the lever 12 stops adjacent the journal 20 of the form cylinder 1. At this position of lever 12, the printing plate 6 is suspended by its leading flange 5 on the edge 4 of the cylinder groove 2. The clamping spindle 7 is then rotated to the position shown in FIG. 2. To turn spindle 7, the lever 12 and the pivoted lever 13 are moved into their extended position (i.e., past the position in which their pivot points are aligned and further in this direction) until the gripper edge 10 rests against the chamfer 11 of the printing plate 6 and the clamping force thereby supplied counteracts the pressure force exerted by the clamping lever 13. *Thus, activation movement of lever 12 is not limited by any kind of stop.* The front edge of the printing plate 6 is thereby oriented exactly parallel to the edge 4 of the cylinder groove 2. When the form cylinder 1 is rotated, the correctly oriented printing plate 6 is then wound onto the cylinder. After this, the clamping spindle 7 is turned back into the position shown in FIG. 1, whereby the lever 12 stops at the journal 20. After the trailing flange 9 of the printing plate 6 is pressed into the cylinder groove 2, the clamping spindle 7 is swung into the position shown in FIG. 2. To accomplish this, the lever 12 and the pivoted lever 13 are again extended to their extended positions. The gripper edge 10 in turn grasps and clamps the leading flange 5 of the [priming] *printing* plate 6, and the leaf springs 8 engage with and grip the hook-shaped bevel of the trailing flange 9 and clamp the trailing flange 9 into position against the form cylinder 1. In this way, both the leading and the trailing flanges 5, 9 are clamped and gripped under the force of the pressure spring 15 (i.e., the clamping spindle 7 turns until the clamping forces on the flanges 5, 9 counteract the spring force of the pivoted lever 13).

To dismount the printing plate 6 from the form cylinder 1, the clamping spindle 7 is turned into the position shown in FIG. 1. The trailing flange 9, is then removed from the cylinder groove 2, the printing plate 6 is unwound from the form cylinder 1 through the backwards rotation of the form cylinder 1, and the printing plate 6 is lifted out of the cylinder groove 2 by its leading flange 5.

Advantageously, the clamping spindle 7 is turned in one direction or the other by the application of a force F1 or F2 to the lever 12 on one side or the other of its pivot point, as shown in FIG. 3. Force F1 is used to close the clamping spindle 7 while force F2 is used to open the clamping spindle 7. Such forces can be supplied, for example, by working cylinders mounted in the frame. The device of the present invention is particularly suitable for automatic plate changes.

Preferably, the chamfer 11 of the leading flange 5 is formed with a V-shaped cross-section. One side of the chamfer 11 is thus well-suited for clamping by the gripper edge 10, while the other side advantageously rests on a groove wall 3 within cylinder groove 2. Alternatively, the chamfer 11 may have other shapes, such as, for example, a U-shape. The leading flange 5 may have knobs with which the gripper edge 10 engages. The leading flange 5 may also have slots, which run in the axial direction of the cylinder 1 and in the area of which the printing plate 6 is curved out toward the clamping spindle 7, so as to form gripper elements.

Figure 4:
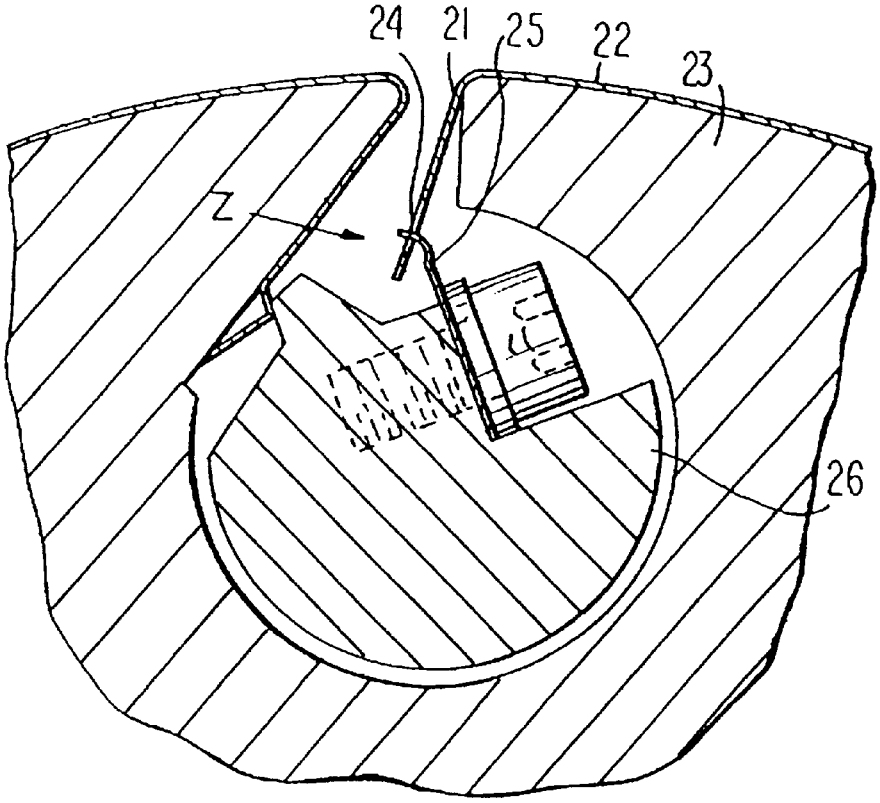
FIG. 4 is a cross-sectional drawing of a second embodiment of the printing plate clamping device of the present invention in the closed position.
Figure 5:
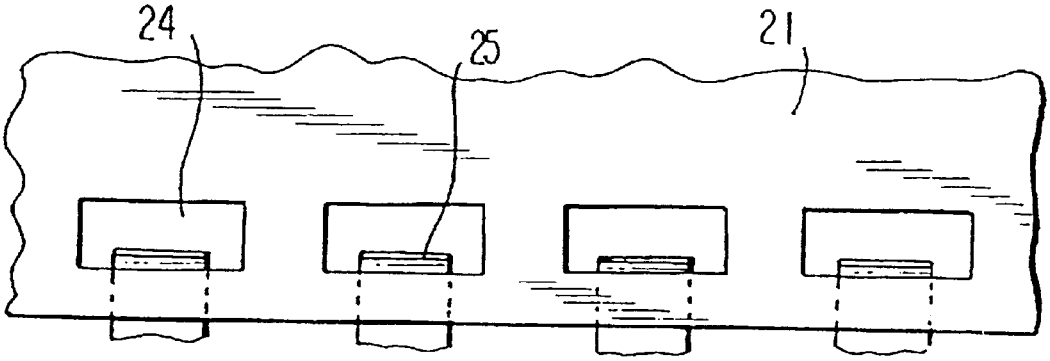
FIG. 5 is a view of the trailing flange and leaf springs of the printing plate clamping device shown in FIG. 4 as viewed in the direction of arrow Z.

In another embodiment of the present invention shown in FIGS. 4 and 5, the trailing flange 21 of the printing plate 22 has rectangular apertures 24 formed proximate the edge of trailing flange 21 across at least a portion of its width, preferably along its entire width. Hook-shaped leaf springs 25 of the clamp spindle 26 are shaped, sized and positioned so as to engage with the apertures 24 of trailing flange 21 in the clamped position. The number of the hook-shaped leaf springs 25 preferably corresponds to the number *of* rectangular apertures 24 in the trailing flange 21. In other respects, the structure and function of the device of this embodiment [am] *are* similar to those of the embodiment described above.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An apparatus for clamping a flexible printing plate onto a form cylinder of a printing machine, comprising:

a form cylinder having a cylinder groove extending substantially axially from a circumferential surface of the form cylinder, the cylinder groove having, *a leading edge,* a leading surface and a trailing surface, [the leading surface having a protrusion extending across a width of the form cylinder extending into the cylinder groove] the flexible printing plate sized to cover and *be* removably disposed upon the circumferential surface of the form cylinder, said flexible printing plate having a leading flange extending into the cylinder groove of the form cylinder and a trailing flange [extending into the cylinder groove of the form cylinder], *the leading flange of the printing plate having a chamfer extending across at least a portion of a width of the printing plate*;

a clamping spindle rotatably mounted within the cylinder groove, said clamping spindle comprising a gripper edge and a leaf spring, said gripper edge having a clamping protrusion extending across a width of the clamping spindle, the clamping protrusion being positioned so that upon rotation of said clamping spindle from an open position to a closed position the clamping protrusion approaches the [protrusion] *chamfer* of the leading [surface] *flange* of the [cylinder groove] *printing plate* to releasably grip [a leading flange] *the chamfer* of the printing plate, to draw the leading flange of the printing plate into the cylinder groove, and to releasably clamp the leading flange of the printing plate against [.the .protrusion of the leading surface] *the leading edge* of the cylinder groove, said leaf spring having a shape so that upon rotation of said clamping spindle from the open position to the closed position the leaf spring releasably grips [a] *the* trailing flange of the printing plate and draws the trailing flange of the printing plate into the cylinder groove, *said clamping spindle being capable of returning from the closed position to the open position after clamping the leading flange of the printing plate against the leading edge of the cylinder groove and after winding the printing plate around the circumferential surface of the form cylinder*.

2. The apparatus of claim 1, wherein said leaf spring extends across at least a portion of a width of the clamping spindle.

3. The apparatus of claim 1, wherein said leaf spring is hook-shaped.

4. The apparatus of claim 3, wherein said leaf spring extends across the width of said clamping spindle.

5. The apparatus of claim 3, wherein the hook-shape of said leaf spring has a 90° curve.

6. The apparatus of claim 1, wherein the trailing flange of the [priming] *printing* plate is hook-shaped.

7. The apparatus of claim 3, wherein the trailing flange of the [priming] *printing* plate is hook-shaped.

8. The apparatus of claim 5, wherein the trailing flange of the printing plate is hook-shaped.

9. The apparatus of claim 8, wherein the hook-shape of the trailing flange of the [priming] *printing* plate has a 90° curve.

[10. The apparatus of claim 1, wherein the leading flange of the priming plate has a chamfer extending across at least a portion of a width of the printing plate, the chamfer having a shape corresponding to the protrusion of the leading surface of the cylinder groove of the form cylinder, the chamfer being positioned on the leading flange so that upon rotation of the clamping spindle from the open position to the closed position the chamfer is releasably clamped against the protrusion of the leading surface of the cylinder groove by the clamping protrusion of the clamping spindle.]

11. The apparatus of claim [10] *1*, wherein the chamfer is V-shaped in cross-section.

12. The apparatus of claim 1, further comprising a lever operatively connected to an end of said clamping spindle so that activation movement of said lever causes said clamping spindle to rotate within the cylinder groove of the form cylinder.

13. The apparatus of claim 12, further comprising a spring means for urging said lever to rotate the clamping spindle from the open position to the closed position.

14. The apparatus of claim 12, [further comprising a stopping means for limiting the] *wherein* activation movement of said lever *is not limited by a stop.*

15. The apparatus of claim 1, where the trailing flange of the printing plate has a plurality of apertures and said leaf spring is formed as a plurality of hook-shaped projections shaped and positioned so as to be engagable with the apertures in the trailing flange of the printing plate.

16. A printing cylinder of a printing machine, comprising:

a form cylinder having a cylinder groove extending substantially axially from a circumferential surface of said form cylinder, the cylinder groove having a leading surface, a leading edge and a trailing surface[, the leading surface having a protrusion extending across a width of the form cylinder extending into the cylinder groove];

a flexible printing plate sized to cover and removably disposed upon the circumferential surface of the form cylinder, said flexible printing plate having a leading flange extending into the cylinder groove of the form cylinder and a trailing flange [extending into the cylinder groove of the form cylinder], *the leading flange of the printing plate having a chamfer extending across at least a portion of a width of the printing plate*; and a clamping spindle rotatably mounted within the cylinder groove of said form cylinder, said clamping spindle comprising a gripper edge and a leaf spring, said gripper edge having a clamping protrusion extending across a width of the clamping spindle, the clamping protrusion being positioned so that upon rotation of said clamping spindle from an open position to a closed position the clamping protrusion approaches the [protrusion] *chamfer* of the leading [surface] *flange* of the [cylinder groove] *printing plate* to releasably grip the [leading flange] *chamfer* of the printing plate, to draw the leading flange of the printing plate into the cylinder groove, and to releasably clamp the leading flange of the printing plate against the [protrusion of the leading surface] *leading edge* of the cylinder groove, said leaf spring having a shape so that upon rotation of said clamping spindle from the open position to the closed position the leaf spring releasably grips the trailing flange of the printing plate and draws the trailing flange of the printing plate into the cylinder groove[, and wherein the leading flange of the printing plate has a chamfer extending across at least a portion of the width of the printing plate, the chamfer having a shape corresponding to the protrusion of the leading surface of the cylinder groove of the form cylinder, the chamfer being positioned on the leading flange so that upon rotation of the clamping spindle from the open position to the closed position the chamfer is releasably clamped against the protrusion of the leading surface of the cylinder groove by the clamping protrusion of the clamping spindle], *said clamping spindle being capable of returning from the closed position to the open position after clamping the leading flange of said printing plate against the leading edge of the cylinder groove and after winding the printing plate around the circumferential surface of the form cylinder.*

17. The printing cylinder of claim 16, wherein said leaf spring extends across at least a portion of a width of said clamping spindle.

18. The printing cylinder of claim 16, wherein said leaf spring is hook-shaped.

19. The printing cylinder of claim 18, wherein said leaf spring extends across the width of said clamping spindle.

20. The printing cylinder of claim 18, wherein the hook-shape of said leaf spring has a 90° curve.

21. The printing cylinder of claim 16, wherein the trailing flange of said printing plate is hook-shaped.

22. The printing cylinder of claim 18, wherein the trailing flange of said printing plate is hook-shaped.

23. The [priming] *printing* cylinder of claim 20, wherein the trailing flange of said [priming] *printing* plate is hook-shaped.

24. The [priming] *printing* cylinder of claim 23, wherein the hook-shape of the trailing flange of said printing plate has a 90° curve.

25. The printing cylinder of claim 16, wherein the chamfer is V-shaped in cross-section.

26. The [priming] *printing* cylinder of claim 16, further comprising a lever operatively connected to an end of said clamping spindle so that activation movement of said lever causes said clamping spindle to rotate within the cylinder groove of said form cylinder.

27. The printing cylinder of claim 26, further comprising a spring means for urging said lever to rotate the clamping spindle from the open position to the closed position.

28. The printing cylinder of claim 26, [further comprising a stopping means for limiting the] *wherein* activation movement of said lever *is not limited by a stop.*

29. The printing cylinder of claim 16, wherein the trailing flange of said printing plate has a plurality of apertures and said leaf spring is formed as a plurality of hook-shaped projections shaped and positioned so as to be engagable with the apertures in the trailing flange of said [priming] *printing* plate.

30. A method for attaching a flexible [priming] *printing* plate to a form cylinder of a printing machine, the form cylinder having a cylinder groove extending substantially axially from a circumferential surface of the form cylinder, the cylinder groove having a leading surface*, a leading edge* and a trailing surface, [the leading surface of the cylinder groove having a protrusion extending across a width of the form cylinder extending into the cylinder groove,] the form cylinder having a clamping spindle rotatably mounted within the cylinder groove, said clamping spindle having a leaf spring[, the clamping spindle having] *and* a clamping protrusion extending across a width of the clamping spindle, the flexible printing plate sized to cover and *be* removably disposed upon the circumferential surface of the form cylinder, said flexible printing plate having a leading flange extending into the cylinder groove of the form cylinder and a trailing flange [extending into the cylinder groove of the form cylinder and ], *the leading flange of the printing plate*

*having a chamfer extending across at least a portion of a width of the printing plate, said method* comprising the following steps in sequence:

a. *placing the clamping spindle in the open position;*

*b.* introducing [a] *the* leading flange of the printing plate into the cylinder groove of the form cylinder;

[b.] *c.* drawing the leading flange of the printing plate into the cylinder groove by rotating the clamping spindle *from the open position to a closed position* so that the clamping protrusion grasps the leading flange of the printing plate so that upon rotation of said clamping spindle from [an] *the* open position to [a] *the* closed position the clamping protrusion approaches the [protrusion] *chamfer* of the leading [surface] *flange* of the [cylinder groove] *printing plate* to releasably grip the [leading flange] *chamfer* of the printing plate to draw the leading flange of the printing plate into the cylinder groove and to releasably clamp the leading flange of the printing plate against the [protrusion of the leading surface] *leading edge* of the cylinder groove;

[c.] *d.* winding the printing plate around the circumferential surface of the form cylinder;

*e. rotating the clamping spindle from the closed position to the open position;*

[d.] *f.* introducing [a] *the* trailing flange of the printing plate into the cylinder groove of the form cylinder; *and*

[e.] *g.* rotating said clamping spindle from the open position to the closed position so that the leaf spring releasably grips the trailing flange of the printing plate and draws the trailing flange of the printing plate into the cylinder groove *and so that the clamping protrusion grasps the leading flange of the printing plate to releasably grip the chamfer of the printing plate to draw the leading flange of the printing plate into the cylinder groove and to releasably clamp the leading flange of the printing plate against the leading edge of the cylinder groove.*

*31. The apparatus of claim 1, wherein said clamping spindle, the leading edge of the cylinder groove of said form cylinder and the leading flange of the printing plate are shaped so that when said clamping spindle is in the open position and the leading flange is mounted on the form cylinder the leading flange of the printing plate is not sandwiched under pressure between the leading surface of the cylinder groove and the clamping spindle.*

*32. The printing cylinder of claim 16, wherein said clamping spindle, the leading edge of the cylinder groove of said form cylinder and the leading flange of said printing plate are shaped so that when said clamping spindle is in the open position and the leading flange is mounted on the form cylinder the leading flange of said printing plate is not sandwiched under pressure between the leading surface of the cylinder groove and the clamping spindle.*

* * * * *